April 17, 1973 R. G. SARGEANT 3,728,129
METHOD FOR PREPARING AND DISPENSING AERATED DRINKS
Filed March 29, 1971 4 Sheets-Sheet 2
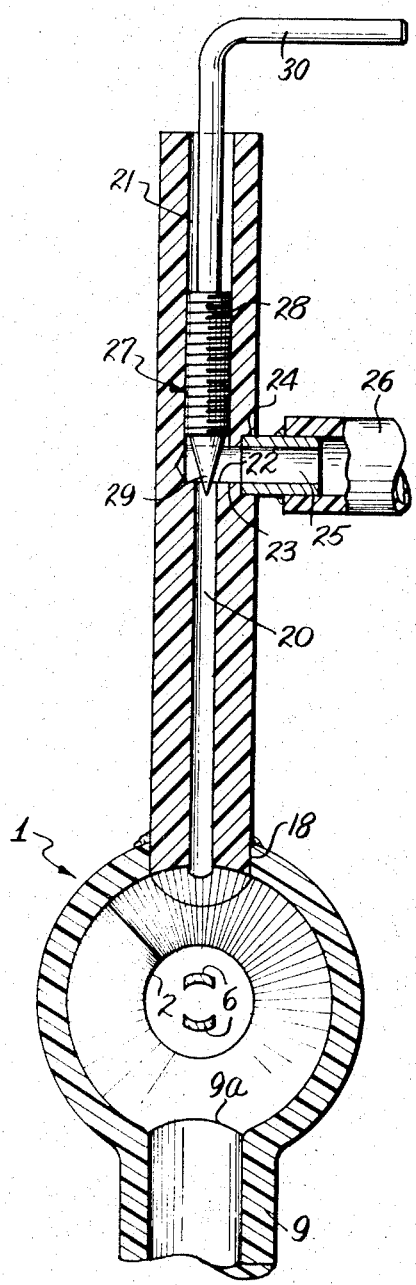
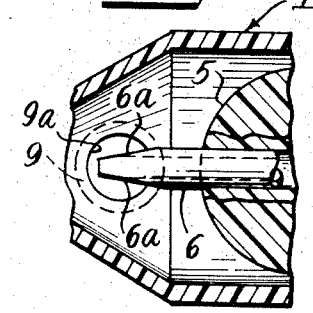
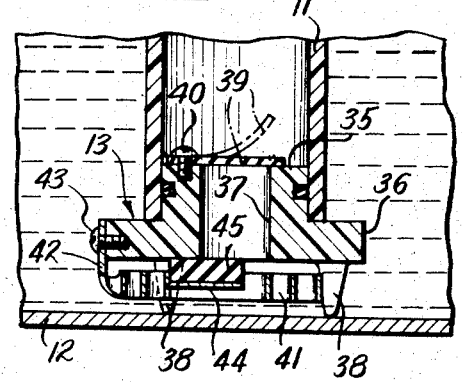
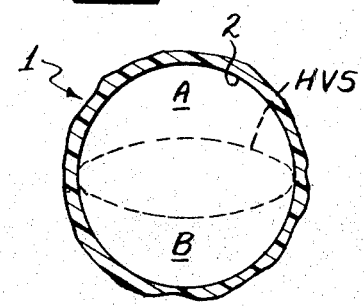
INVENTOR
RALPH G. SARGEANT
BY Roylance, Abrams, Berdo & Kaul
ATTORNEYS April 17, 1973        R. G. SARGEANT        3,728,129

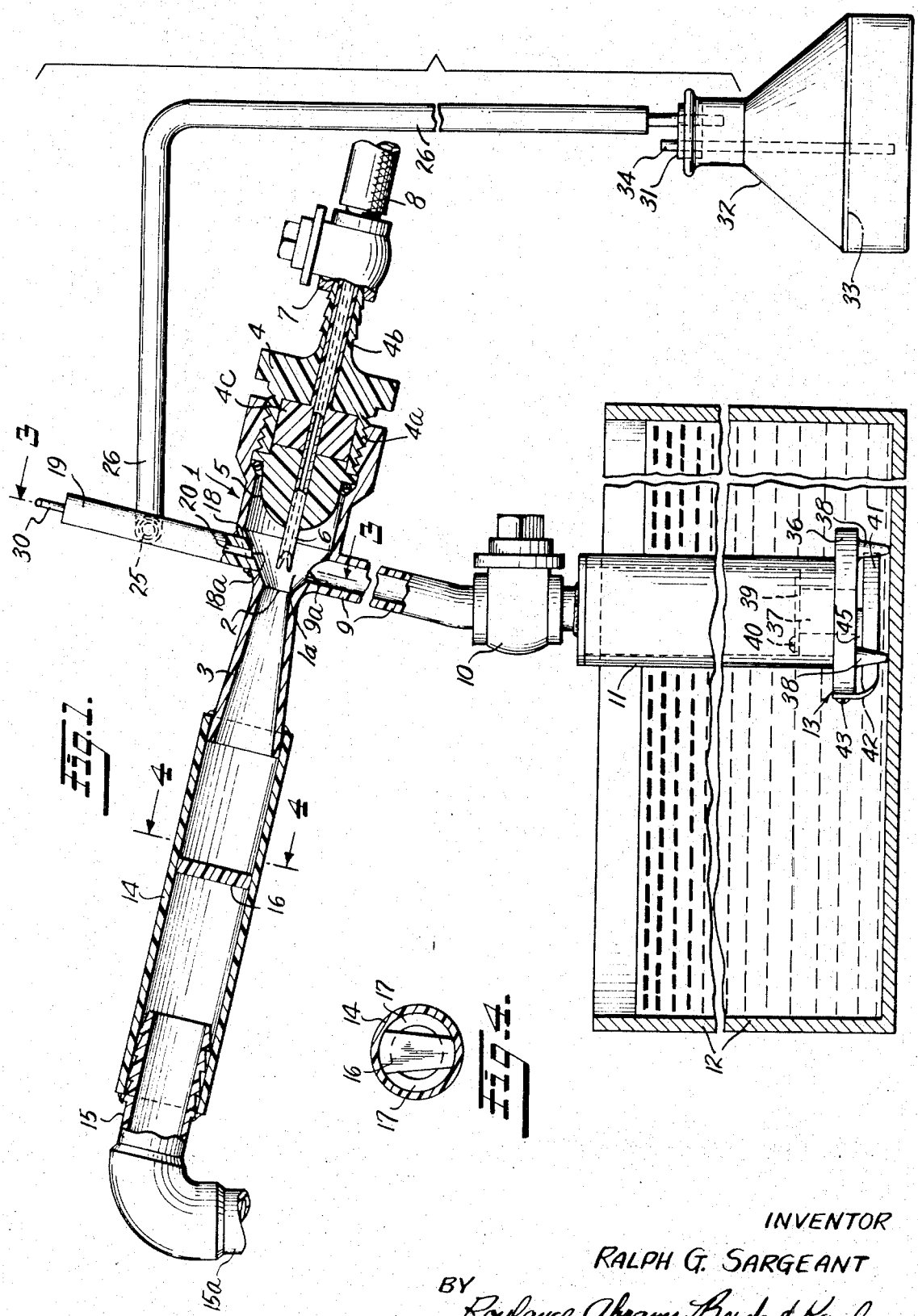

METHOD FOR PREPARING AND DISPENSING AERATED DRINKS

Filed March 29, 1971        4 Sheets-Sheet 4

INVENTOR
RALPH G. SARGEANT

BY Roylance, Abrams, Berdo & Kaul
ATTORNEYS

United States Patent Office 3,728,129
Patented Apr. 17, 1973

3,728,129
METHOD FOR PREPARING AND DISPENSING AERATED DRINKS
Ralph G. Sargeant, 408 W. Windsor St., Lakeland, Fla. 33803
Continuation-in-part of application Ser. No. 76,040, Sept. 28, 1970, which is a continuation-in-part of abandoned application Ser. No. 856,064, Sept. 8, 1969. This application Mar. 29, 1971, Ser. No. 128,711
Int. Cl. A23l 1/00
U.S. Cl. 99—78                                10 Claims

ABSTRACT OF THE DISCLOSURE

Method of preparing drinks, such as orange juice, by combining a diluting liquid with a liquid beverage concentrate. A high velocity stream of one of the liquids is directed through the restricted throat of a Venturi located in a flow confining zone causing the other liquid ingredient to be drawn into this zone. This preliminary mixture is then forcibly impinged on a baffle surface in a final mixing zone. Air, preferably with a volatile flavor and/or aroma additive entrained therein, is introduced either into the flow confining zone where it becomes part of the preliminary mixture or into the final mixing zone upstream of the baffle.

RELATED APPLICATIONS

This application is a continuation-in-part of my copending application Ser. No. 76,040, filed Sept. 28, 1970, which in turn is a continuation-in-part of my application Ser. No. 856,064, filed Sept. 8, 1969, and now abandoned.

BACKGROUND OF THE INVENTION

In the marketing of various beverage materials, such as citrus juices, it has become common practice for the producer to process the beverage raw material into a concentrate which is distributed over a wide geographic area for reconstitution into the final beverage. In that portion of the retail market in which the reconstituted beverage is prepared in the household, the concentrate can simply be packaged and distributed, and a large demand has developed for packaged concentrates because final preparation of the final beverage from the concentrate can be accomplished more easily and quickly than when, e.g., fresh oranges must be squeezed to provide juice. This portion of the market is now highly developed, and current production and distribution techniques are successful to the extent that great quantities of orange juice concentrates and the like are now consumed in the home.

However, a large additional potential market for beverage concentrates has as yet not been satisfied. This potential market is that which can be served with drink dispensers, particularly coin operated dispensers, designed to prepare and dispense beverages on a per drink basis. Though the concept of marketing beverages by coin operated and like dispensing machines which formulate a drink during each operation of the dispenser is quite old, and though many such dispensers are presently in use, the success attained to date in this field is small in comparison to the total potential market, particularly in the case of citrus juices. A general reason for such limited success is the difficulty in devising an economically practical apparatus which is dependably capable of mixing the beverage materials adequately and in the proper proportions in the short time available for the preparation of each drink. Even more serious, however, have been problems arising from the fact that the drink must be prepared from a concentrate. While various techniques have been developed for concentrating juices and other beverage materials, the methods commonly employed involve steps, such as evaporation and/or drying, which diminish or eliminate natural factors responsible for the desirable organoleptic properties which the consumer has come to recognize as characteristic of the natural product. Thus, in the case of most beverage concentrates, simply mixing the concentrate with, e.g., water, provides a drink which is relatively poor as compared to the "fresh" or "natural" beverage material.

Such problems have proved particularly vexing to those attempting to market orange juice by supplying a juice concentrate to be reconstituted on a drink-by-drink basis in coin operated and like dispensers. The commercially practical procedures for manufacturing orange juice concentrates markedly reduce certain natural flavor constituents, such as orange oil, orange essence, and essence oil, so that mixing of the concentrate with water provides a reconstituted drink having a flavor and aroma recognized by the consumer as falling short of fresh orange juice. Similarly, even when such concentrates are thoroughly mixed with an amount of water accurately controlled to provide the proportions of natural juice, the drink is organoleptically unlike the natural juice. Typically, consumers recognize a different, less desirable, "mouth feel," a relatively "flat" taste, and a reduced or unnatural aroma. Prior art workers have sought to overcome these difficulties in various ways. Thus, it is common to add small proportions of orange oil and orange essence to finished orange juice concentrates, but such additions have proved of relatively little value in improving the flavor of the reconstituted beverage. Similarly, orange juice concentrates are frequently "cut back," at the point of manufacture, by the addition of orange pulp and fresh juice, with some moderate improvement thus being achieved in the reconstituted drink. It has also been proposed to aerate the reconstituted beverage, but this too has provided only a nominal improvement in the finished product. In general, drinks prepared from orange juice concentrates on a per drink basis in dispensing machines have fallen far short of that level of quality which consumers generally attribute to orange juice, and such acceptance as has been achieved in this field appears to stem mainly from the fact that the drink can be obtained quickly from a conveniently located dispenser.

OBJECTS OF THE INVENTION

In general, the object of the invention is to provide a method whereby air, and advantageously air having a volatile additive or additives entrained therein, is introduced into the constituents for the drink in a fashion such that small bubbles of the air, or air and entrained additive, are uniformly distributed through a uniform mixture of the drink constituents.

Another object is to provide a method for producing drinks from a beverage concentrate and a liquid diluent on a per drink basis requiring only a short time period of, e.g., a few seconds per drink, with the finished drink being characterized by an improved flavor, aroma and other organoleptic properties.

A further object is to devise a method for producing an organoleptically superior fruit drink, such as an orange juice drink, which can be practiced with coin operated drink dispensers.

Yet another object is to provide an improved method for preparing drinks containing additives responsible for flavor and aroma.

SUMMARY OF THE INVENTION

The invention is based on method steps which accomplish not only more effective mixing of the major constituents of the drink, such as a juice concentrate and water, but also a more thorough aeration, with the air advantageously carrying vapors of a volatile additive, than has heretofore been possible in the short mixing times allowable when dispensing drinks on a per drink basis. Considering a drink to be prepared from a concentrate and a diluent, the method is carried out by establishing a high velocity stream of one of the constituents, typically the diluent, in a first zone in a fashion that establishes a partial vacuum in that zone, and employing the partial vacuum to effect a regulated flow of the other constituent, typically the concentrate, into the first zone. The energy of the high velocity stream is employed to project a preliminary mixture of the constituents into a final mixing zone where the stream is impinged on a traverse baffle surface, the stream being disrupted and caused to flow transversely and in recirculating fashion in the final mixing zone upstream of the baffle surface. Air, or air carrying entrained vapors of an additive, is introduced either to the first zone, in which case the air is drawn in under influence of the partial vacuum, or at a point just downstream from the baffle surface, in which case the air is supplied under a pressure greater than atmospheric pressure. In either case, the volatile additive is entrained in the air by causing the air to pass through a chamber in which a quantity of the additive is confined. Advantageously, the first zone and the final mixing zone are coaxial and inclined upwardly in the direction of travel of the high velocity stream in such manner that, when each mixing operation is complete and the high velocity stream terminated, a quantity of the drink mixture drains back into the first zone in recycle fashion so that, when the high velocity stream is reeestablished, for mixing of the next drink, the stream is projected through a quantity of the mixture prepared during mixing of the previous drink.

In order that the manner in which the foregoing and other objects are attained according to the invention can be understood in detail, particularly advantageous embodiments thereof will be described with reference to the accompanying drawings, which form a part of the original disclosure of this application, and wherein:

FIG. 1 is a longitudinal sectional view, with parts shown in side elevation, of an apparatus by which the method can be carried out;

FIG. 2 is an enlarged fragmentary longitudinal sectional view illustrating the tip of the discharge tube of the apparatus of FIG. 1;

Figure 7:
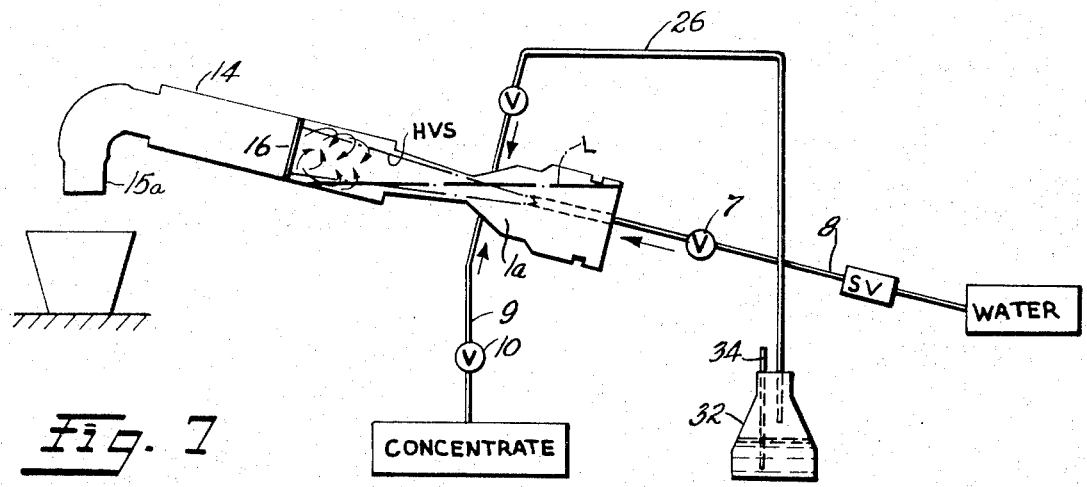
Figure 8:
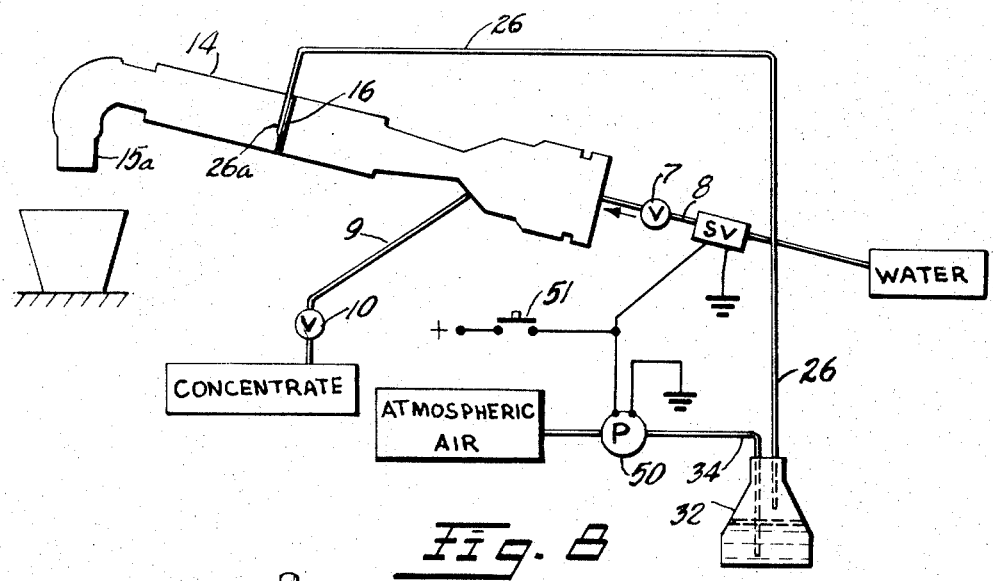
Figure 10:
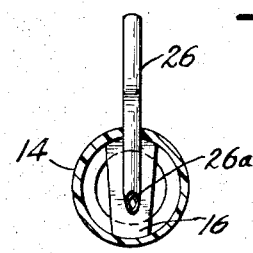
Figure 9:
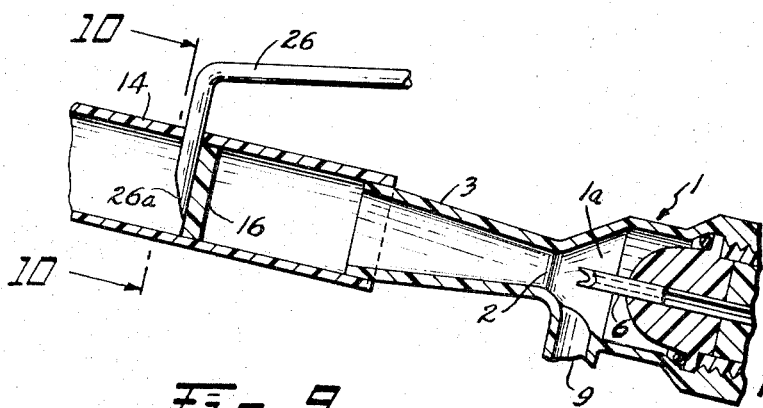

FIGS. 3 and 4 are transverse sectional views taken generally on lines 3—3 and 4—4, FIG. 1, respectively;

FIG. 5 is an enlarged fragmentary vertical sectional view illustrating a check valve and thermostatic control employed in the apparatus of FIG. 1;

FIG. 6 is a semi-diagrammatic view illustrating the relationship between the cross-sectional shape of the high velocity stream and the Venturi throat during operation of the apparatus of FIG. 1;

FIG. 7 is a diagrammatic illustration of the manner in which one method embodiment of the invention is carried out, using the apparatus of FIGS. 1–6;

FIG. 8 is a view similar to FIG. 7 but illustrating another embodiment of the method;

FIG. 9 is a fragmentary longitudinal sectional view showing a portion of the device of FIG. 1 modified to accomplish the method embodiment of FIG. 8;

FIG. 10 is a transverse sectional view taken on line 10—10, FIG. 9; and

Figure 11:
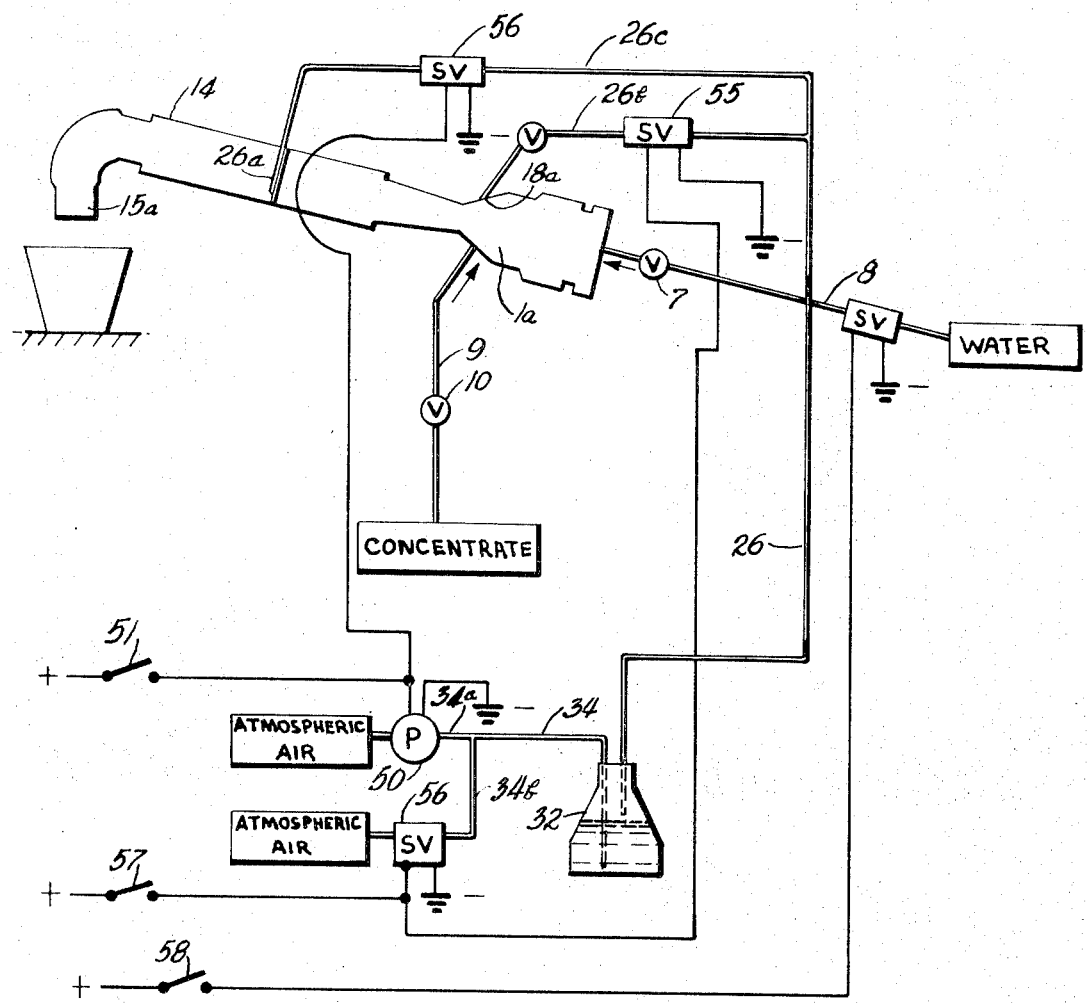

FIG. 11 is a diagrammatic illustration of the manner in which a further embodiment of the method can be carried out.

TYPICAL APPARATUS FOR CARRYING OUT THE METHOD

Referring to the drawings in detail, the apparatus of FIGS. 1–6 will first be described in order to provide a background for description of the method. The apparatus is adapted to be used in a drink dispenser which dispenses drinks individually, mixing each drink at the time it is dispensed. The device comprises a Venturi mixing device including a body 1 defining a restricted throat 2 and an outwardly and forwardly flaring discharge chamber 3. The end of body 1 opposite chamber 3 defines an inlet chamber which is internally threaded, and into this threaded portion there is fitted an externally threaded plug member 4, the interengaged threads being indicated at 4a, FIG. 1. The combination of the inlet chamber, the throat 2, and the discharge chamber constitutes a flow-confining zone in which, as later explained, a preliminary mixture of the constituents of the drinks is formed.

At its end opposite the Venturi, plug member 4 has an axial extension 4b. A cylindrical bore extends axially through the entire plug member and is greatly enlarged at the end of plug member which is directed toward the interior of the Venturi. The enlarged portion of this bore encloses a thick disc 4c of resilient material, and a rounded nose member 5, both the disc and nose member having axially aligned bores. A small discharge tube 6 extends completely through body member 4 and through the axial bores of members 4c and 5, the length of tube 6 being such that the tip thereof extends beyond the nose member 5 to a point adjacent throat 2 of the Venturi. The tube 6 is of such small diameter that, with liquid supplied thereto at a practical pressure of, e.g., 25 p.s.i., the liquid will be discharged as a high velocity stream. Typically, discharge tube 6 can be a surgical cannula modified by having the tip tapered, so that the tip includes two flat, forwardly converging, side surfaces 6a each interrupted by a forwardly opening notch formed by intersection of the side surface with the cylindrical inner wall of the tube, as best seen in FIG. 2.

In the assembly just described, it will be understood that the position of plug member 4 relative to body 1, adjusted by relative rotation of the plug member and body, determines the axial position of the tip of tube 6 relative to the throat 2 of the Venturi. It will also be understood that member 4c serves to provide a fluid-tight seal between tube 6 and plug member 4, and that the nose member 5 decreases the space within the body of the Venturi device on the input side of the throat so that a higher vacuum can be produced.

Extension 4b of plug member 4 is inserted directly into one port of an adjusting valve 7, the other port of valve 7 being connected to a water supply tube 8 through which water is supplied at a constant pressure whenever the dispenser is actuated to prepare and dispense a drink.

Body 1 is also provided, on the input side of throat 2, with a side or suction duct 9 which communicates with the interior of the Venturi body via a port 9a. Duct 9 is connected directly to an adjustable valve 10 which in turn is connected to one end of a feed tube 11 extending downwardly to a point immediately adjacent the bottom of a small cylindrical tank 12 in which the beverage concentrate or other constituent to be mixed with the water to form the drink is contained. A combined check valve and thermostatic flow control device, indicated generally at 13 and later described in detail, is secured to the lower end of tube 11 and serves to allow flowable material in tank 12 to be drawn upwardly through the feed tube when the device is in operation, and to prevent material from draining back into the tank when the device is not being operated.

The downstream end of body 1 is disposed in and rigidly secured to one end of a straight cylindrical tube 14 which defines a laterally confined final mixing zone. Tube 14 is aligned coaxially with Venturi body 1. The combination of body 1, plug member 4 and tube 14 is inclined upwardly (in the direction of flow) at a small angle, e.g., 10–15°, to the horizontal. The downstream end of tube 14 is engaged over and rigidly secured to the input tube 15 of a dispensing nozzle 15a.

A baffle plate 16, in the form of a relatively thick piece of polymeric material, extends transversely across the interior of tube 14 in a location midway between tube 15 and elements 3. Plate 16, as seen in FIG. 4, has curved ends engaging the inner wall of tube 14, as with a force fit, and is of tapered plan configuration with the straight side edges of the plate converging downwardly. The dimensions of baffle 16 are such that it only partially closes tube 14 so that there is a passage 17, FIG. 4, at each side between one of the tapered edges of the baffle which extends chordwise of the circular cross section of the tube, and the corresponding portion of the interior walls of tube 14. Baffle 16 is centered on the axis of tube 14 so as to be presented as a target to the high velocity stream discharged into tube 14 by discharging tube 6 of the Venturi device.

Body 1 is also provided, on the input side of throat 2, with a side or suction duct 18 which opens into the inlet chamber of the Venturi via a port 18a advantageously located diametrically across from port 9a. An upright rod 19 of polymeric material has its lower end disposed in duct 18 in a mechanically secure and fluid-tight fashion. Rod 19 has a through bore including a lower portion 20 of small diameter and an upper portion 21 of larger diameter, there being a transverse annular shoulder 22 at the juncture between the bore portions 20 and 21. A side port is provided in rod 19 immediately above the shoulder 22 and includes a small diameter inner portion 23 and a larger diameter outer portion 24. A short stainless steel tube 25 is inserted with a force fit into portion 24 of the side port and projects outwardly from the rod 19 by a short distance adequate to allow the end of a flexible polymeric tube 26 to be secured over tube 25.

A movable metal valve member 27 is provided to cooperate with the valve seat afforded by shoulder 22. Member 27 includes a threaded straight portion 28, a pointed lower tip 29, and at its upper end a laterally projecting handle 30. Portion 28 is engaged in the bore portion 21 of rod 19 in a self-threading relationship, i.e., the threads of portion 28 forming mating threads in the wall of bore portion 21 as the valve member is inserted with rotation, the valve member having been sufficiently inserted into the rod to bring the valve tip 29 into coacting relationship with shoulder 22. The position of tip 29 relative to shoulder 22 defines an orifice to control the flow of air or other fluid (supplied via the side port) through bore portion 20 into the inlet portion of the flow-confining zone defined by body 1.

Flexible tube 26 extends through the stopper 31 of a flask 32 which serves as a supply of volatile additive, a liquid body of the additive being indicated at 33, FIG. 1, and the portion of the interior of the flask above the liquid containing the volatile additive in vapor form. Tube 26 terminates above the surface of body 33. An air supply tube 34 also extends through stopper 31 and terminates well below the surface of the liquid, thus placing the interior of the flask in communication with atmospheric air via the liquid in the flask.

Flow control device 13, FIG. 5, comprises a cylindrical body 35 having an outwardly projecting transverse annular flange 36, body 35 being disposed in and secured in fluid-tight relation to the lower end portion of tube 11. A cylinder bore 37 extends axially through body 35. Flange 36 is of substantially larger diameter than the outer diameter of tube 11 and the flange is provided with a series of three depending feet 38 adapted to engage the bottom wall of tank 12. A check valve member 39, in the form of a thin, normally flat disc of resiliently flexible polymeric material is disposed across the upper end of body 35, being secured thereto by a screw 40. During operation of the device to mix a drink, element 39 deflects upwardly, as indicated by the broken lines in FIG. 5, to allow upward flow of the flowable concentrate or other material in tank 12. When the mixing operation is terminated, element 39 returns to the position shown in solid lines in FIG. 5, closing bore 37 against downward flow, with the result that the combination of duct 9, the interior of valve 10, and tube 11 is filled with concentrate or other material preparatory to mixing of the next drink.

When the apparatus is employed to mix orange juice concentrate, for example, with water, the supply tank 12 for the concentrate will be refrigerated, and it is highly desirable to compensate for the effect of changes in viscosity of the concentrate which result from changes in temperature. This is particularly important in drink dispensers which mix the drink as it is dispensed, since such devices may be called upon to provide a number of drinks in quick succession, or only to provide a single drink, so that the concentrate temperature which the refrigerating means has achieved at any one time is not predictable. To provide such compensation, the apparatus is equipped with the thermostatic valve shown in FIG. 5 and comprising a bimetallic thermostatic element 41 in the form of a single bimetal strip wound in spiral fashion. At the outer end of the spiral, a portion 42 of the strip is twisted and bent upwardly to engage the periphery of shoulder 36, end portion 42 being secured to the shoulder by a screw or other suitable fastener 43. The inner end portion 44 of the bimetal strip is twisted so as to extend parallel to the bottom face of shoulder 36 and, because of the width of the bimetal strip, is spaced a significant distance below the lower end of bore 37. A valve element 45 is fastened to the upper face of inner end portion 44 and is of such thickness that its top surface is in sliding contact with the bottom face of body 35.

Since the spiral bimetal strip 41 is located below valve body 35, so as to be disposed between body 35 and the bottom of tank 12, the bimetal strip is constantly immersed in the orange juice concentrate or like flowable material contained by the tank. Accordingly, the bimetal strip responds to the temperature of the orange juice concentrate or like material which is to be drawn into the mixing device. The configuration and dimensions of the spiral bimetallic strip are so chosen that, when the strip is at a predetermined temperature, e.g., the mean temperature of the refrigerated concentrate, the strip holds the valve element 45 in a position partially closing bore 37. The nature of the bimetal strip is such that, when the temperature to which it is exposed decreases below the predetermined value, the spiral of the strip contracts, with the result that valve element 45 is moved progressively away from the mouth of bore 37, so that a greater portion of the mouth of the bore is open for liquid flow. Conversely, when the temperature of the concentrate increases, the spiral of the bimetallic strip 41 expands, causing valve element 45 to move progressively across the mouth of bore 37, thus decreasing the effective size of the mouth of the bore. Accordingly, the size of the opening through which the concentrate is drawn into the mixing apparatus is adjusted inversely with respect to the temperature of the concentrate, so that the induced flow of concentrate, during operation of the mixing device, remains relatively unaffected by changes in temperature, and thus changes in viscosity, of the concentrate.

GENERAL DESCRIPTION OF THE METHOD

The apparatus of FIGS. 1–6 can be employed to carry out the method, preparing and dispensing, e.g., fruit juice beverages on a drink-by-drink basis. The flow confining zone defined by body 1 includes an inlet portion 1a, an intermediate restriction defined by throat 2, and an outflow portion 3, the latter opening into the final mixing zone defined by tube 14. Chamber 12 contains a quantity of juice concentrate, and the inlet portion 1a of the flow confining zone is maintained in communication with the body of concentrate via the duct 9, the flow control orifice provided by valve 10, and tube 11. Inlet portion 1a of the flow confining zone is also maintained in communication with the atmosphere via duct 20, FIG. 3, the flow control orifice defined by elements 22 and 29, tube 26, the interior of flask 32, and tube 31, the arrangement being such that, to enter inlet portion 1a, the air must traverse the liquid in flask 32 and the vapors above the surface of the liquid in the flask. Alternatively, tube 26 can be disconnected so that only air is supplied via side port tube 23.

Assume that discharge tube 6 has an inner diameter of 3/32 in. and that water is supplied to tube 8 at a constant pressure of 25 p.s.i. At such supply pressure, the water is discharged from tube 6 at a high velocity of, e.g., in excess of 600 inches per second. Because of the tapered configuration of the tip of tube 6, the high velocity stream of water emitted from the discharge tube is of elliptical transverse cross section, with the long axis of the ellipse extending horizontally, though tube 6 can be adjusted rotationally to provide any other angular disposition of the long axis of the ellipse. Accordingly, the axial position of the discharge tube relative to the throat of the Venturi can be adjusted so that only the edge portions of the stream at the ends of the long axis of the elliptical cross section thereof engage or are immediately adjacent to the circular surface defining throat 2. Thus, as indicated in FIG. 6, there are significant spaces between the high velocity stream and the wall of throat 2 at the ends of the short axis of the elliptical cross section, i.e., at locations A and B, FIG. 6. Though the high velocity water stream does not completely fill the throat, the initial action of the stream is to generate a partial vacuum in the inlet portion of the flow-confining zone defined by body 1. Such partial vacuum causes concentrate to be drawn upwardly through tube 11, valve 10 and duct 9 into the inlet portion of the Venturi device. Accordingly, very quickly after the high velocity stream is initiated, enough concentrate is provided in the area of port 9a so that the concentrate is picked up by the water stream and carried forwardly through the throat. Such initial pick up of concentrate by the water stream first reduces and then eliminates the free spaces at A and B, FIG. 6, and the device then functions with full Venturi action to induce the flow of concentrate and air at rates which are directly dependent on the velocity of the water stream, accepting the design perimeters of the Venturi device to be constant and predetermined. Accordingly, very quickly after the flow of the high velocity water stream is initiated, the device functions to discharge forwardly into tube 14 a combination of water, concentrate, and air in the proportions desired for the drink.

In addition to providing the hydraulic flow necessary to operate the Venturi device, the high velocity water stream serves both to preliminarily mix the water, concentrate and air within body 1, and then to project the preliminary mixture forwardly through tube 14 and onto baffle 16. The velocity of the water stream is such that the mixture projected through tube 14 impinges forcibly onto the transverse surface presented by baffle 16, the result of such impingement being that the stream is disrupted in random fashion, major portions of the mixture being caused to flow transversely outwardly and then rearwardly along the internal surface of tube 14 in recirculating fashion. Once a steady state of operation of the device is attained, tube 14 is full of liquid. The high velocity stream, concentrated generally along the axis of the tube, moves forwardly at high velocity while the liquid in the outer areas of the space defined by the tube moves variously in a recirculating fashion and in a turbulent fashion. Recirculating movement is greatest in the portions of the internal area of tube 14 aligned with the ends of baffle 16, that is, the upper and lower portions of the space. A more turbulent and random flow pattern is established in the areas aligned with spaces 17, FIG. 4. Once steady state operation has been achieved, the final mixture is carried off to the dispensing point by nozzle 15a at a flow rate determined by the aggregate flow rate of water, concentrate and air into the device.

FIG. 7 illustrates in diagrammatic fashion the steady state of operation of the device. The Venturi body 1 defines a first flow-confining zone in which (a) the predetermined proportional flow of water, concentrate and air is established and (b) an initial or preliminary mixing of the three constituents is accomplished. As indicated by broken lines at HVS, the high velocity stream discharged by tube 6 tends to persist, providing the energy necessary to carry the preliminary mixture through tube 14 and cause the same to impinge forcibly on the baffle 16. Tube 14 defines a laterally confined final mixing zone in which the preliminary mixture is converted to a completely mixed condition, but the mixing action which occurs in this zone is effected by the energy of the high velocity water stream originally emitted from tube 6. Typical flow patterns occurring in this zone and resulting in uniformity of the final mixture are indicated by the arrows in FIG. 7.

Since, when the apparatus is first started up, the overall space defined by body 1 and tube 14 is essentially empty, a short initial operation is carried out with the mixture discharged through nozzle 15a to waste, since the very first liquid emerging from the device, on start up, will not be mixed completely. When steady state operation has been achieved, the apparatus is deactivated, e.g., by simply terminating the water flow by shutting off the solenoid valve SV, FIG. 7. With the discharge of water stopped, some of the final mixture drains from nozzle 15a, until liquid reaches a natural level L, FIG. 7. At this point, it is to be noted that valve element 39 is closed, preventing any drain back from body 1 into tank 12. Accordingly, when the apparatus is first operated to dispense a finished drink, throat 2 of the Venturi device is completely filled with liquid which is a mixture of water, concentrate and air. While this residual mixture may not be completely uniform, it has been subjected to an extensive amount of mixing. When a drink is to be mixed and dispensed, the solenoid valve SV is again opened and the high velocity stream of water is again discharged from tube 6. In this operation, a full Venturi action is instantly established, since the throat of the Venturi body is initially filled with the residual liquid remaining from the last operation of the device. The operation is now essentially that previously described, save that the first liquid appearing in the dispensing nozzle 15a is essentially completely mixed and has the proportions desired for the final drink. Operation of the solenoid valve SV is controlled to limit the flow of water through tube 6 to a predetermined time period which will be adequate to deliver just that amount of finished drink desired.

It is to be particularly noted that the air induced via bore 20 of rod 19 is introduced into the preliminary mixture formed within body 1. Thus, the air employed for aerating the drink is combined with and distributed through the water and concentrate before final mixing of the drink is effected in the zone defined by tube 14. Further, final mixing in that zone is accomplished as a result of forcible impingement of the preliminary mixture into baffle 16, with the attendant turbulent flow and recirculation. Since partial mixing has already occurred before the mixing zone, the air is distributed throughout the final drink in uniform manner and as relatively small bubbles. In the case of orange juice, for example, this results in the dispensed drink having a foamy "head" and a distinctly improved "mouth feel," in comparison with drinks heretofore provided in dispensing machines.

Such uniform, small bubble aeration is capitalized on to provide a way to incorporate in the drink controlled proportions of volatile additives, such as orange oil, orange essence, or essence oil, in the case of an orange juice drink. Thus, the air introduced into the mixture is carried through flask 32, entering the flask via air tube 34. With the flask containing a liquid body of orange oil, for example, a substantial amount of orange oil vapors exist in the flask above the liquid. Each time a drink is mixed and dispensed, a controlled volume of air is drawn into flask 30, and a corresponding volume of the air-vapor mixture is drawn downwardly through the liquid to the lower end of tube 26. Accordingly, during preparation of a drink with the apparatus of FIG. 1 by the method hereinbefore described, each cycle of operation of the apparatus introduces a predetermined volume of air which in turn carries a predetermined amount of the vapors of the volatile additive. This feature is of particular importance in preparation of orange juice drinks since there has heretofore been no practical and economical way of metering small quantities of the relatively corrosive additives on a continuous basis.

Considering the method broadly, the air or combination of air and additive, can be introduced at flow rates in the range of 0.1–1.0 cu. in. per sec., the rate being determined by the design parameters of the Venturi device and the adjustment of valve member 27. The air flow rate is predetermined in view of the extent of aeration desired, the size of the drink, and the time period of flow of the high velocity stream required to make the particular drink. Similarly, while discharge rates in excess of 500 in. per sec. for the high velocity stream are particularly advantageous, the method can be practiced with stream discharge rates as low as 250 in. per sec.

ORANGE JUICE EMBODIMENTS

The method can be carried out with orange juice concentrates having densities in the range of 40–72° Brix is particularly advantageous when orange juice concentrates of high density, e.g., in excess of 50° Brix, are employed. Water is employed as the diluent, supplied at a constant pressure of, e.g., 25 p.s.i., yielding a discharge velocity at the tip of tube 6 of slightly in excess of 690 in. per sec. when tube 6 has an inner diameter of 3/32 in. A volatile additive selected from the group consisting of orange oil, orange essence and orange essence oil, or a combination of such additives, is entrained in the air supplied to the inlet portion 1a of the flow confining zone, with valve element 27 adjusted to provide a rate of air flow within the range of 0.1–1.0 cu. in. per sec. and advantageously within the range of 0.25–0.5 cu. in. per sec., and with the volatile additive being supplied in small proportions, e.g., 0.003–0.005% by volume for orange oil, 0.00001–0.0001% by volume for orange essence, and 0.0001–0.00075% by volume, for orange essence oil, based on the total drink mixture. In considering the proportion of volatile additive to be employed, it must be kept in mind that only a portion of the volatile additive is retained in the liquid of the drink, a substantial proportion of the additive escaping to the atmosphere during foaming and attendant escape of air from the drink after the drink has been dispensed.

Volatile flavor and/or aroma additives for use in accordance with the invention can be produced, for example, in accordance with the teachings of my U.S. Pat. 3,428,463, issued Feb. 18, 1969.

In carrying out a typical embodiment of the method with the apparatus of FIGS. 1–6, tank 12 is filled with an orange juice concentrate having a density of 53.85° Brix and a viscosity of 3000 centipoises at 75° F., no additive having been introduced into the concentrate. Water is supplied to tube 8 at a constant pressure of 25 p.s.i., and is discharged from the tip of tube 6 at a velocity slightly in excess of 690 in. per sec., with operation being commenced by opening valve SV, in FIG. 7. A liquid body of orange essence is provided in flask 32, and valve 27 is adjusted to provide a flow of air, with orange essence vapor entrained therein, into inlet portion 1a of the flow, confining zone, equal to 0.35 cu. in. per sec. The design parameters of the Venturi device are chosen to cause one part of concentrate to be induced to flow through port 9a for each 4 parts of water, by volume discharged from tube 6 when the water supply pressure is 25 p.s.i. With an 8 oz. cup held under dispensing nozzle 15a, valve SV is maintained open until the cup is full, requiring a time of approximately 3 sec.

The drink supplied to the cup comprises water and orange juice concentrate in a ratio of 4:1 by volume, air, and a small proportion of orange essence. Immediately upon filling of the cup, the drink is very foamy, there being an attractive and distinct head approximating that obtained by rapidly agitating fresh orange juice. When the drink has been allowed to stand quiescent for a few minutes, the density becomes stable at approximately 13° Brix. The drink is characterized by a marked flavor and aroma, distinctly superior to the flavor and aroma of the usual reconstituted orange juices of the prior art. This improvement arises not only from the superiority of mixing and aeration achieved according to the invention but also from the fact that the orange essence is incorporated in a thorough and effective fashion, being present in each increment of air incorporated in the drink. The improved effect of introduction of the orange essence is observable immediately as the drink is withdrawn from the dispenser, since some of the introduced air escapes during foaming of the drink and carries with it some of the orange essence vapor. The taste of the drink is markedly improved, possibly because some of the orange essence is present in the air distributed through the drink.

Alternatively, the method can be employed to produce orange juice drinks which, though aerated in the fashion described, contain no volatile additive. When the method is practiced in that fashion, tube 26 can be removed from tube 25, so that atmospheric air is drawn directly into tube 25.

DRINKS OTHER THAN ORANGE JUICE

Though the invention has particular advantages in connection with production of drinks from orange juice concentrates, the method is also useful for producing drinks from other juice concentrates which are in the form of flowable liquids, including particularly drinks from pineapple juice concentrates, and for producing drinks from soft drink syrups, e.g., cola drink syrups.

In the case of pineapple juice drinks, the method can be practiced as hereinbefore described, employing a pineapple juice concentrate of, e.g., 60° Brix concentration and adjusting the apparatus to provide one part by volume of the pineapple juice concentrate for each 5.5 parts by volume of water discharged via tube 6. Air flow at a small rate of, e.g., 0.3 cu. in. per sec. is established by adjustment of metering valve member 27, the air being passed through flask 32 and there being a quantity of pineapple essence in the flask. The finished drink has a density of 10.5–11° Brix and organoleptic qualities essentially like fresh pineapple juice.

ALTERNATIVE EMBODIMENTS

While the embodiment described with reference to FIGS. 1–7 is particularly advantageous because it capitalizes on the energy of the high velocity stream to induce flow of the air and volatile additive, and because the air is introduced at the preliminary mixing stage so as to be subject to the mixing action occurring upstream from the baffle surface, the method can also be practiced with the air introduced into the final mixing zone in the manner shown in FIGS. 8–10.

FIG. 8 illustrates diagrammatically the apparatus of FIGS. 1–6, but without the side port 18a and associated valve mechanism. Flask 32 is again employed, but with tube 26 extending to the final mixing chamber and including a tip portion 26a inserted through a port in the wall of tube 14 in such fashion that the open end of tip portion 26a is disposed at the central axis of tube 14 at a point immediately adjacent to baffle 16 on the downstream side thereof, as seen in FIGS. 9 and 10. Instead of opening directly to the atmosphere, tube 34 is connected to the output of an electrically operated air pump 50, the inlet of pump 50 being open to the atmosphere. Pump 50 can, for example, be an electrically operated diaphragm pump of the type commonly used for aerating aquariums. The motor of pump 50 and the actuating solenoid of valve SV are connected in parallel for simultaneous control by a manual switch 51. When switch 51 is closed, the solenoid of valve SV is energized to open the valve and establish the high velocity stream through the Venturi device, and the motor of pump 50 is simultaneously energized to operate the pump to pass air at a constant rate through tube 34, the body of liquid additive 33 in flask 32, the free space above body 33 in the flask, and tube 26, so that air, with vapors of the additive entrained therein, is discharged continuously from tip 26a into the final mixing chamber just downstream from baffle 16.

Though the downstream portion of the final mixing chamber may be substantially full of the drink mixture, the pressure immediately downstream from baffle 16 is reduced relative to the pressures in other areas of tube 14 and is small relative to the operating pressure provided by pump 50. Accordingly, the air supplied via tip 26a continuously enters the drink mixture and, due to the turbulent flow of the liquid in the immediate vicinity of tip 26a, is mixed with the liquid.

FIG. 11 indicates a further embodiment in which air, with volatile additive entrained therein, can be supplied solely via port 18a, to the inlet portion 1a of the flow confining zone defined by the Venturi device, or solely to the final mixing zone via tip 26a of tube 26, or simultaneously both to the inlet portion 1a of the flow confining zone and to the final mixing zone. When the method is to be carried out in this fashion, tube 26 is branched to provide portions 26b and 26c, with portion 26b leading to port 18a via a solenoid valve 55 and the valve means 22, 27 of FIG. 3, and with portion 26c leading to tip 26a via a solenoid valve 56. Tube 34 is branched to provide portions 34a and 34b, with portion 34a connected to the output of pump 50, and portion 34b connected to the atmosphere via solenoid valve 56.

Switch 51 is connected to pump 50 and solenoid valve 56 in parallel, so that valve 56 is opened whenever switch 51 is closed to start pump 50. A manual switch 57 is connected in parallel to solenoid valves 55 and 56, so that both of these valves are opened whenever switch 57 is closed. A third switch 58, which can be ganged independently to switches 51 and 57, is provided to control the solenoid valve SV in water supply line 8.

With switches 57 and 58 closed and switch 51 open, the operation is as described with reference to FIGS. 1-6, with the action of the high velocity stream of water in the Venturi device serving to induce air, with entrained additive, to flow into inlet portion 1a, pump 50 remaining inactive. When switches 51 and 58 are closed and switch 57 open, the operation is as described with reference to FIGS. 8-10, solenoid valves 55 and 56 being closed. When switches 51, 57 and 58 are all closed, air with vapor of the additive entrained therein is supplied simultaneously to inlet portion 1a and to the final mixing zone via tip 26a.

APPLICATION OF THE METHOD TO IMPROVING JUICE CONCENTRATES

The method can also be employed to incorporate a volatile flavor and/or aroma promoting additive to a juice concentrate with the concentrate then being packaged in sealed containers for distribution.

In this embodiment, the concentrate in flowable liquid form is supplied via tube 6 so that the high velocity stream projected through the Venturi device is of concentrate rather than a diluent. Port 9a is eliminated, and the valve provided by elements 22, 27 is used, with tube 26, flask 32 and tube 24, all as shown in FIGS. 1 and 3, so that the high velocity stream of concentrate causes air, with additive vapor entrained therein, to be induced to flow into the inlet portion 1a via side port 18a. Final mixing is effected in tube 14, in the same manner hereinbefore described, to distribute the air and additive uniformly through the concentrate.

What is claimed is:
1. The method for preparing individual drinks comprising two components, one of which is a flowable drink concentrate and the other of which is a liquid diluent, comprising
  providing
    a flow confining zone having an inlet portion, an outlet portion, and an intermediate restriction,
    a laterally confined final mixing zone axially aligned with the outlet portion of the flow confining zone, and
    a baffle surface extending at least generally transversely across the final mixing zone;
  directing one of the components through the flow confining and final mixing zones in the form of a high velocity stream travelling from the inlet portion toward the outlet portion,
    said high velocity stream being emitted at a rate of at least 250 inches per second and directed axially through the restriction,
    the transverse cross-sectional area of said high velocity stream as it passes through the restriction being smaller than that of the restriction,
    passage of said high velocity stream through the restriction causing a partial vacuum in the inlet portion of the flow confining zone;
  supplying the other of the components into the inlet portion of the flow confining zone;
  metering air at a predetermined rate into at least one of said flow confining zone and said final mixing zone;
  said high velocity stream persisting after passage through the intermediate restriction,
    said components being initially formed into a preliminary mixture by the passage of said high velocity stream through the intermediate restriction, and the preliminary mixture being projected forwardly from the restriction and forcibly impinged upon said baffle surface,
    forcible impingement of said preliminary mixture on said baffle surface causing the stream to be disrupted, with attendant mixing action resulting in said final mixing zone; and
  conducting the resulting aerated uniform mixture away from said final mixing zone to a dispensing point.

2. The method according to claim 1, wherein
the air introduced by metering air into at least one of said flow confining zone and said final mixing zone has entrained therein a volatile additive in vapor form, which additive has a desirable aroma; and
the uniform mixture conducted away from said final mixing zone contains bubbles of air which still carries part of said volatile additive,
  whereby, when said mixture is collected as a finished drink, bubbles of air escaping from the drink will carry with them a significant, readily detectable aroma-producing quantity of said volatile additive.

3. The method according to claim 1, wherein
said step of metering air into at least one of said flow confining zone and said final mixing zone is carried out by maintaining said inlet portion of said flow confining zone in communication with the atmosphere via a flow control orifice.

4. The method according to claim 1, wherein
said step of metering air into at least one of said flow confining zone and said final mixing zone is carried out by pumping air at a controlled rate into said final mixing zone.

5. The method according to claim 4, wherein
the air is pumped into said final mixing zone at a point immediately downstream from said baffle surface.

6. The method according to claim 1, wherein
said one component directed through said flow confining zone as a high velocity stream is an aqueous diluent; and said other component supplied to said inlet portion of said flow confining zone is an orange juice concentrate having a density of 40–72° Brix and a viscosity at 75° F. of 3000–7000 centipoises.

7. The method according to claim 6, wherein said high velocity stream has a discharge velocity of at least 500 in. per sec.;

the rate of flow of said concentrate into said inlet portion of said flow confining zone is maintained to provide a diluent-to-concentrate ratio by volume of from 1:1 to 10:1, depending upon the density of the concentrate and the characteristics desired for the drink;

said step of metering air is carried out by placing said inlet portion of said flow confining zone in communication with the atmosphere via a flow control orifice; and the rate of flow of air into said inlet portion of said flow confining zone is maintained at 0.1–1.0 cu. in. per sec.

8. The method according to claim 7, wherein the density of said oragne juice concentrate is at least 50° Brix;

the rate of flow of air into said inlet portion of said flow confining zone is maintained at 0.25–0.5 cu. in. per sec.; and the density of the finished drink mixture, after dispensing and being allowed to become quiescent, is approximately 13° Brix.

9. The method according to claim 6, wherein the air introduced into said input portion of said flow confining zone contains a minor proportion of a volatile additive selected from the group consisting of orange oil, orange essence, and orange essence oil.

10. The method according to claim 9, wherein said volatile additive amounts to 0.003–0.005% by volume of the total drink mixture when the additive is orange oil, 0.00001–0.0001% when the additive is orange essence, and 0.0001–0.00075% when the additive is orange essence oil.

References Cited

UNITED STATES PATENTS

| | | | |
|---|---|---|---|
| 2,993,683 | 7/1961 | Mills | 261—18 R |
| 2,625,505 | 1/1953 | Cross | 99—205 |
| 3,560,226 | 2/1971 | Laskin | 99—140 R |
| 3,549,051 | 12/1970 | Bencic | 222—129.2 |
| 3,357,598 | 12/1967 | Kraft | 222—134 |
| 3,016,916 | 1/1962 | Kraft | 137—604 |
| 2,766,910 | 10/1956 | Bauerlein | 222—129.2 |
| 2,823,833 | 2/1958 | Bauerlein | 222—129.2 |
| 2,785,830 | 3/1957 | Bauerlein | 222—57 |
| 2,785,833 | 3/1957 | Bauerlein et al. | 222—108 |

OTHER REFERENCES

Jacobs, Carbonated Beverages, 1959, p. 236–241.

MORRIS O. WOLK, Primary Examiner

S. B. DAVIS, Assistant Examiner

U.S. Cl. X.R.

99—105; 137—604; 222—1; 261—18 R, 78 A; 417—55